Figure 1:
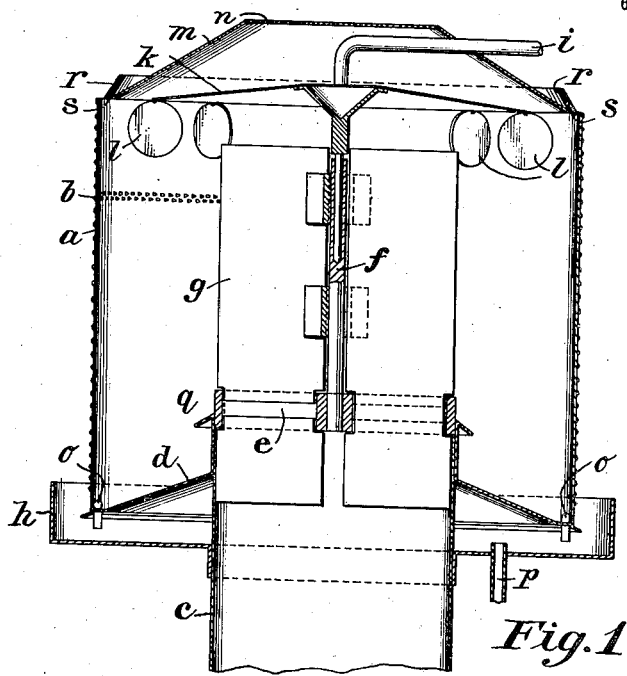

J. A. HART.
APPARATUS FOR PRODUCING INTERACTION BETWEEN LIQUIDS AND GASES OR VAPORS.
APPLICATION FILED DEC. 4, 1911.

1,072,849.

Patented Sept. 9, 1913.

6 SHEETS—SHEET 1.

Witnesses

Inventor:
John Alston Hart,

By Dodge and Sons,

Associate Atty's.

J. A. HART.
APPARATUS FOR PRODUCING INTERACTION BETWEEN LIQUIDS AND GASES OR VAPORS.
APPLICATION FILED DEC. 4, 1911.
1,072,849.
Patented Sept. 9, 1913.
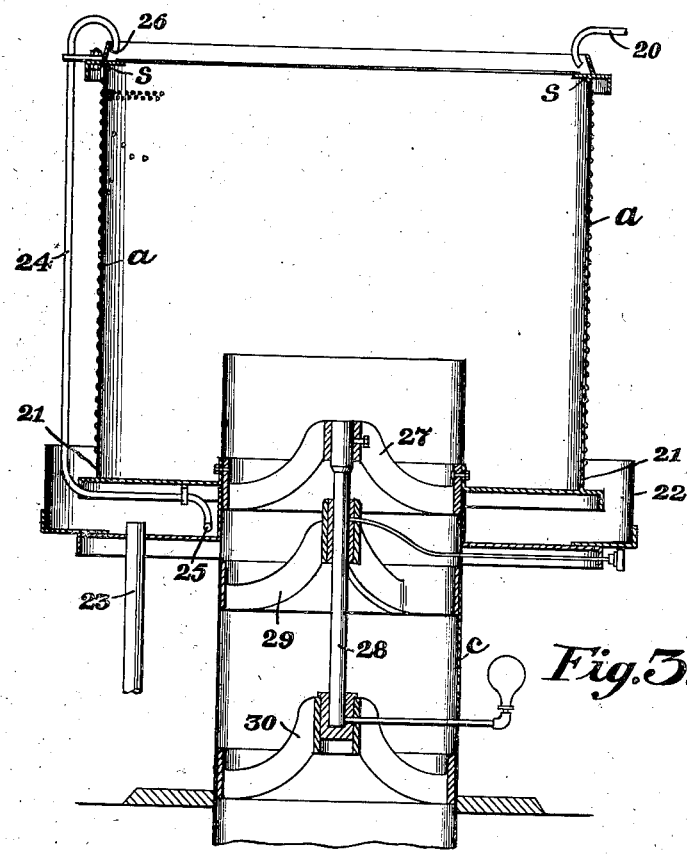
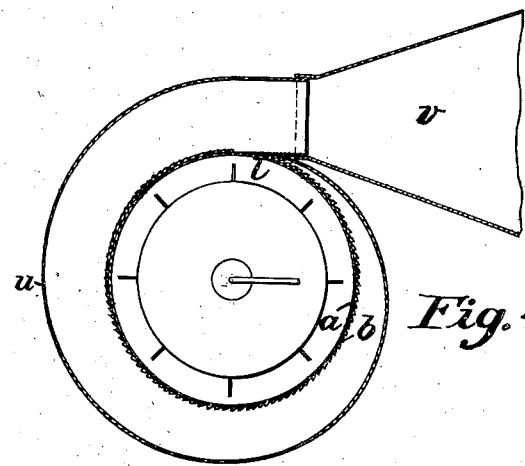

J. A. HART.
APPARATUS FOR PRODUCING INTERACTION BETWEEN LIQUIDS AND GASES OR VAPORS.
APPLICATION FILED DEC. 4, 1911.

1,072,849.

Patented Sept. 9, 1913.

6 SHEETS—SHEET 3.

Witnesses

Inventor:
John Alston Hart,
By Dodge and Sons,
Associate Atty's.

J. A. HART.
APPARATUS FOR PRODUCING INTERACTION BETWEEN LIQUIDS AND GASES OR VAPORS.
APPLICATION FILED DEC. 4, 1911.
1,072,849.
Patented Sept. 9, 1913.
6 SHEETS—SHEET 5.
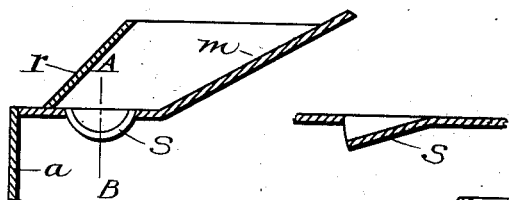
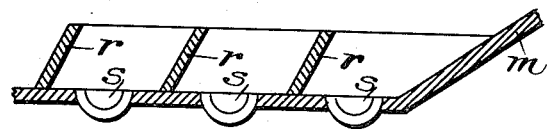
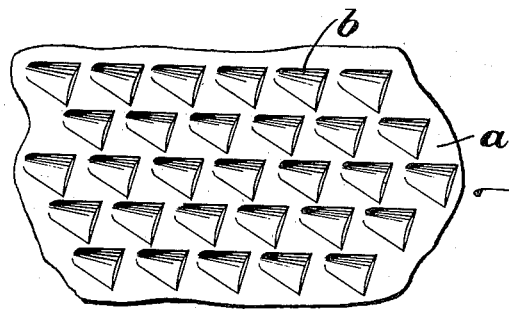
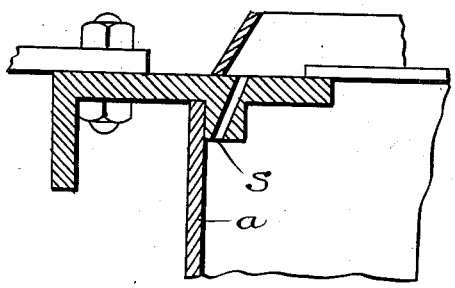
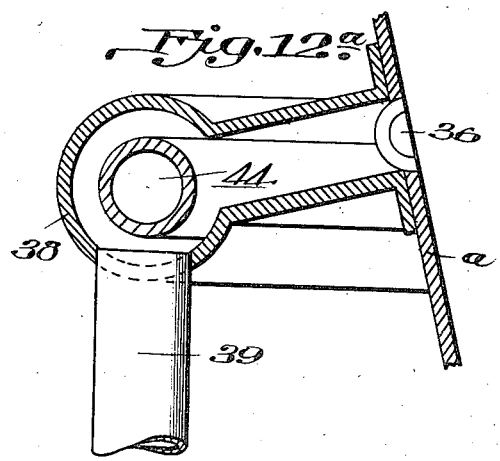
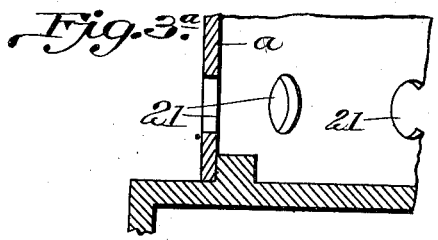
Witnesses
Inventor:
John Alston Hart,
By Dodge and Sons,
Associate Atty's.

J. A. HART.
APPARATUS FOR PRODUCING INTERACTION BETWEEN LIQUIDS AND GASES OR VAPORS.
APPLICATION FILED DEC. 4, 1911.

1,072,849.

Patented Sept. 9, 1913.

6 SHEETS—SHEET 6.

UNITED STATES PATENT OFFICE.

JOHN ALSTON HART, OF BLACKBURN, ENGLAND.

APPARATUS FOR PRODUCING INTERACTION BETWEEN LIQUIDS AND GASES OR VAPORS.

1,072,849.   Specification of Letters Patent.   Patented Sept. 9, 1913.

Application filed December 4, 1911. Serial No. 663,915.

*To all whom it may concern:*

Be it known that I, JOHN ALSTON HART, a subject of the King of Great Britain, residing at Blackburn, in the county of Lancaster, in the Kingdom of England, have invented certain new and useful Improvements in Apparatus for Producing Interaction Between Liquids and Gases or Vapors, of which the following is a specification.

This invention relates to apparatus for producing interaction between liquids and gases or vapors for the purpose of obtaining a mixture of the two interacting fluids, or the production of a physical or chemical action of one upon the other, or the removal of solid particles from one of them, and for other analogous purposes.

The essential element of the apparatus is a member having a curved wall formed with a large number of comparatively small ports or passages shaped to permit currents of gas or vapor (hereinafter referred to as "gas") to pass through and be delivered to the concave surface of the wall tangentially or approximately tangentially to the curve thereof, while liquid is fed to the gas upon or adjacent to the said wall and is broken up and mixed with the gas by the tangentially directed currents passing through the wall and over the concave surface thereof, the gas being subsequently separated either completely or partially from the liquid particles by being caused to move inward away from the said surface while the liquid particles are to a greater or less extent retained near the said surface by centrifugal action with the object of enabling the gas to be removed or discharged from the apparatus after its interaction with the liquid. In order to advantageously secure the centrifugal separating action which follows the mixing of the gas and liquid, the tangentially ported surface will preferably have a circular form as hereinafter set forth, so that the gas can be withdrawn at or about the center of the vortex after its interaction with the liquid, while the liquid particles will be thrown outward by the whirling currents and will be kept in effective contact with the gas currents passing through and over the surface. The liquid particles are thrown about by the gas currents at or about the openings of the ports and are thus broken up, and then redeposited by centrifugal action and again broken up, so that very intimate contact is secured between the liquid and gas by this process, and solid particles if present are separated from the gas and carried away with the liquid.

The apparatus is applicable for a very large number of purposes; some of these are hereafter mentioned for purposes of illustration, it being understood that the use of the apparatus is not restricted to these purposes. The apparatus may be employed for the purpose of humidifying, cooling, warming, or drying air by bringing it into contact with water. Whether the air takes up or deposits moisture depends on the temperature of the air and water and the amount of moisture present in the air before treatment. In some cases where it is desirable to remove moisture a solution having a greater capacity for absorbing moisture, for instance, calcium chlorid solution, may be employed as the liquid. While performing the operation of humidification or drying, the apparatus will also, as hereinafter explained, have the effect of removing solid particles from the air which will accordingly be cleaned as well as dried or humidified. Further, if the solution of calcium chlorid or the like be cooled to a low temperature, the air may be cooled while being dried, and may then be used for instance in cold storage rooms and so forth. Similarly the apparatus may be employed for washing gas other than air, for instance, producer or blast furnace gas. The apparatus may also be employed for condensing or absorbing vapor or gas, or for removing vapor from a mixture of gas and vapor. For instance, ammonia gas might be absorbed by water in this apparatus. In addition to or instead of the production of action upon a gas by means of a liquid, the gas may be caused to exert an action upon the liquid; for instance the liquid may be cooled or warmed by contact with cold or hot gas. As an example of this action may be mentioned the treatment with water of air supplied from the outside atmosphere to the interior of a room for the purpose of adjusting its temperature and relative humidity, this treatment being accompanied by the cooling of the water, so that water taken from some other apparatus, for instance a similar apparatus dealing with the atmosphere inside the room, may be taken to the apparatus dealing with the incoming air and there cooled and prepared for re-use in the apparatus inside the room. Other examples of the uses of the apparatus are the charging of liquids with gas, for instance oxygenating or ozonizing liquids, or charging gases with liquid, and replacing or supplementing the brine circulating pipes of refrigerating apparatus as a means for supplying cooled air. In the latter case the cold brine may be caused to act upon the air in the apparatus and this air then caused to circulate in the chamber or space to be cooled. The cooling action of the brine on the air will be accompanied by a drying action which is due both to the low temperature of the brine and to the absorbent action of the solution.

The present apparatus is to be distinguished from apparatus of the type in which interaction is produced by means of mechanical "scrubbing," the gas or vapor and liquid being passed through and between parallel, relatively moving surfaces, spaced a short distance apart (for instance, concentric cylinders or cones), and having projections adapted to act as beaters and baffles to produce agitation of the fluids between the surfaces. In the present case the essential element is a single surface so formed and disposed that the conditions necessary for intimate interaction can be produced by simply causing gas and liquid to flow over the surface, as above described and as hereafter more particularly indicated with reference to the accompanying drawings which illustrate a number of forms of construction of the apparatus.

Figure 2:
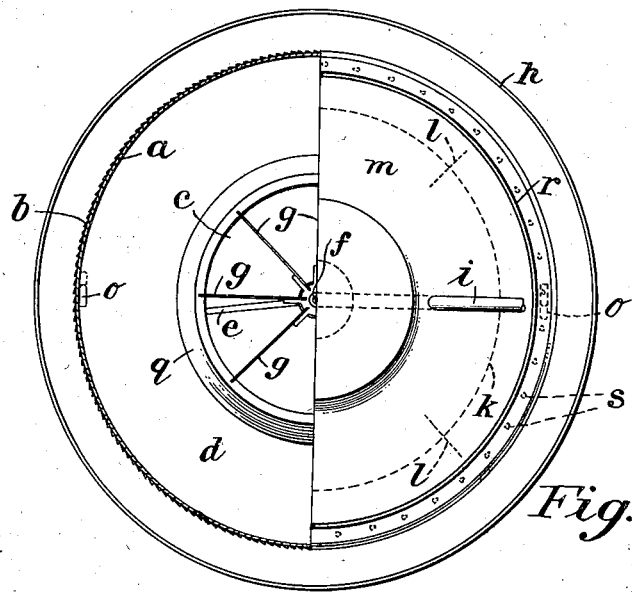
Figure 5:
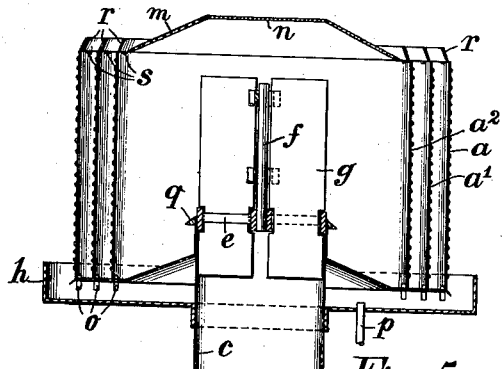
Figure 6:
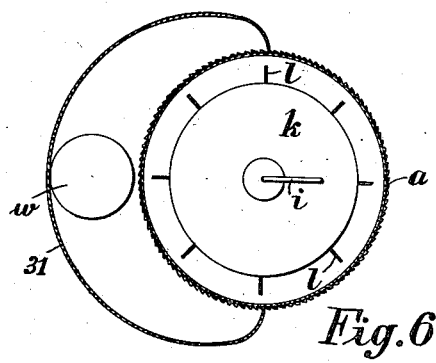
Figure 7:
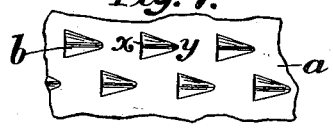
Figure 11:
Figure 12:
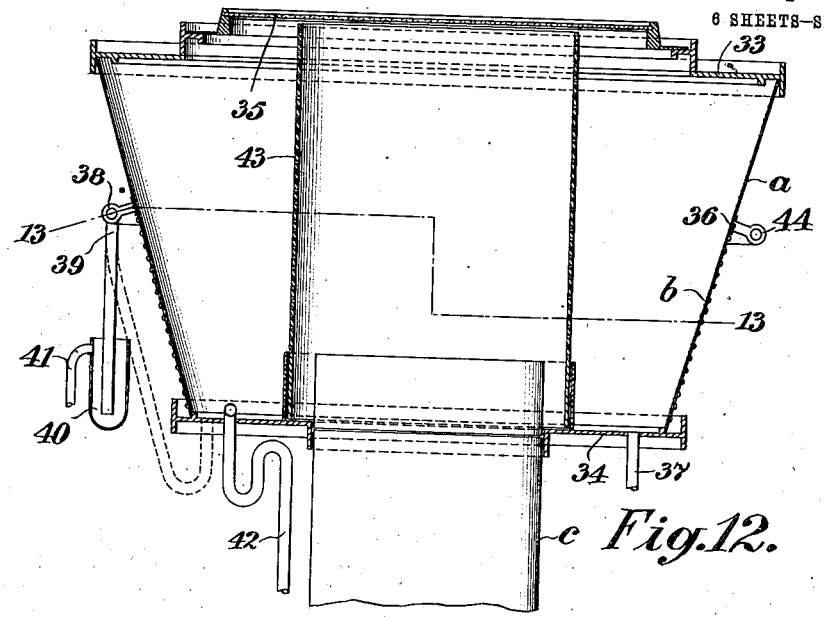
Figure 13:
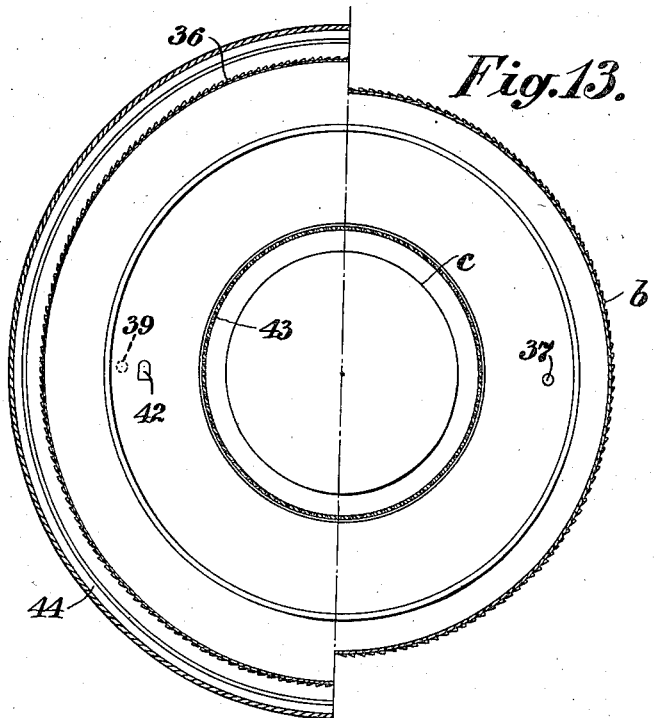
Figure 15:
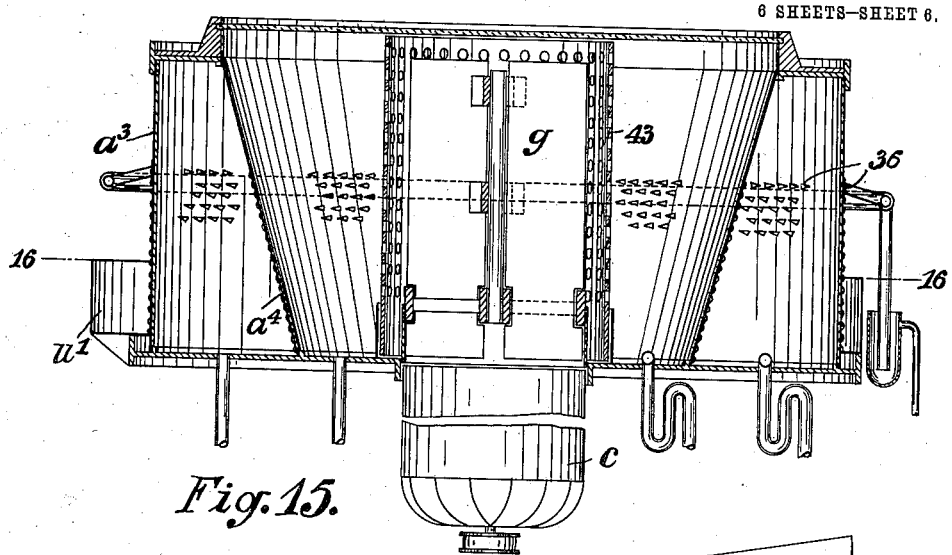
Figure 16:
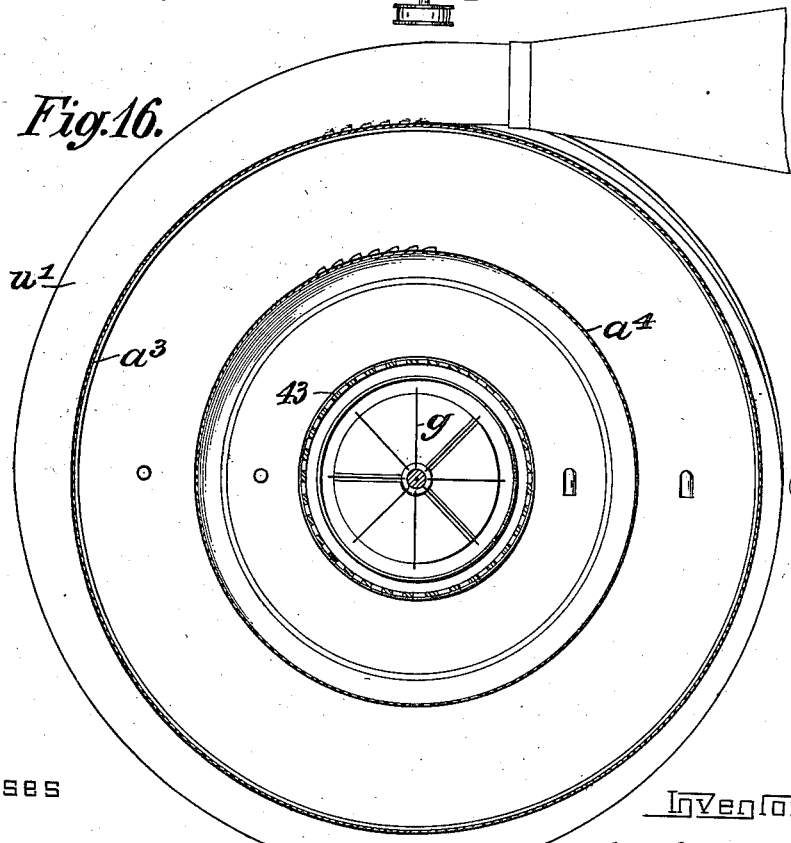

In these drawings:—Figure 1 is a sectional elevation of an apparatus made according to this invention; Fig. 1$^a$ is an enlarged fragmentary section of a portion of Fig. 1, showing the construction of the parts in greater detail; Fig. 2 shows a plan view thereof, partly in section; Fig. 3 is a similar view to Fig. 1, showing a modified construction; Fig. 3$^a$ is a fragmentary sectional view showing portions of Fig. 3 upon an enlarged scale; Fig. 4 shows a particular form of casing for introducing the gas to the apparatus, the view being a sectional plan view; Fig. 5 shows an arrangement for enabling the gas and liquid to become intermixed and to act one upon another in a number of separate stages; Fig. 5$^a$ is an enlarged section of a portion of Fig. 5 showing the construction in greater detail; Fig. 6 is a diagram showing an arrangement for admitting gas from two different sources to the apparatus; Fig. 7 is a face view; and Fig. 8, a section showing a particular form of the apertures in the walls of the device; Fig. 9 is a similar figure to Fig. 7 showing a slightly different form of the apertures; Fig. 10 is a section showing another form of aperture; Fig. 11 is a detail view showing two forms of nozzles for feeding the liquid into the apparatus; Fig. 12 is a vertical central section of another form of the apparatus; Fig. 12$^a$ is an enlarged fragmentary view showing in section a portion of Fig. 12; Fig. 13 is a horizontal section on the line 13—13 of Fig. 12; Fig. 14 is a view similar to Figs. 7 and 9 showing a modified arrangement of the apertures; Fig. 15 shows a vertical section of an arrangement in which several of the features shown in the preceding figures are combined together to form a single apparatus; Fig. 16 is a horizontal section on the line 16—16 of Fig. 15.

In Figs. 1 to 6, 12, 13, 15 and 16, the sheet metal parts of the device and especially the perforated cylinder, cone, cylinders, or cones generally represented by the character $a$ appear thicker than is the case in actual practice, it being impossible upon the small scale of the drawings to represent these parts in their true size. Consequently in considering the drawings, due allowance should be made for the fact, the true proportions of the parts being more correctly shown in other figures.

Referring first to Figs. 1 and 2, $a$ is a cylindrical surface on or adjacent to which the interaction of the gas and liquid takes place. The cylinder $a$ is formed of thin sheet metal in the example shown and has a large number of comparatively small apertures or passages formed in it, as indicated for instance at $b$. There may be some thousands of these apertures in the cylinder $a$ extending in rings or rows around the same from the top or near to the top down to the bottom or near to the bottom of the cylindrical member, the apertures in one row being staggered in position relatively to those in the next row. The apertures $b$ may be of the form shown in Figs. 7 and 8, made by stamping or cutting and pressing out hood-shaped projections from the metal sheet, so as to form approximately tangential apertures communicating from the outside to the inside of the cylinder. $c$ is a passage or wind trunk communicating with a suitable fan capable of drawing through the apparatus a large volume of air or gas. The construction of the fan itself is not a feature of the invention since any device which is capable of causing a current of gas to pass through the apparatus will in general answer the purpose. One form of fan is illustrated diagrammatically on the lower end of the wind trunk $c$ in Fig. 15. The cylindrical shell $a$ is supported in any convenient manner as for instance by a coned tray $d$ hung from the top of the wind trunk $c$. $e$ is a support for a central shaft $f$ by which a number of radial vanes or blades $g$ are held in place. In the example shown there are eight of these blades $g$, the object of which is to resist or prevent the continuance of the whirling motion of the gas as it enters the trunk $c$. $h$ is a suitable tray for receiving or collecting liquid. $i$ is a pipe for leading in liquid to the top of a revolving dish-shaped member $k$ which is supported to turn in the top of the shaft $f$, and has wings or blades $l$ which will be carried around by the circulating air currents in the apparatus. The top of the casing is closed by a wall $m$ with a plate glass disk $n$ therein through which the working of the apparatus can be inspected. $o$ are bent pipes for carrying away liquid with or without solid particles from the bottom of the casing $a$ and discharging it for instance into the tray $h$ from which the liquid escapes by an overflow $p$. The pipes $o$ are bent at the top in a direction to receive the liquid as it circulates in the casing $a$. Of course the liquid may be taken directly from the pipes $o$ or from the overflow $p$ and either recirculated in the apparatus or otherwise treated as may be desired.

The apparatus as described so far operates as follows:—When a current of air or gas is drawn through the apparatus through the wind trunk $c$, the gas entering through the tangentially arranged apertures $b$ is caused to circulate rapidly inside the shell $a$ and the liquid distributer $k$ is carried around owing to the action of the circulating currents on the blades $l$. The liquid fed into the center of this distributer is therefore thrown outward in a fine sheet or spray against the walls of the casing and tends to fall down the said walls, collecting at the bottom and being carried out through the pipes $o$. The action is the same no matter whether the object is to humidify air, or to clean air or gas by removing particles from it in the water, or to treat air or gases with liquid in other ways. The liquid in flowing over the surface of the shell $a$ is broken up into an extremely finely divided form as it passes into the currents of incoming gas and as it is thrown by centrifugal action against the walls $a$, being again sprayed by the gas currents and again thrown inward and carried around in a condition of spray until finally the liquid reaches the bottom where it collects and then flows out through the outlets $o$. The liquid may of course be returned to the top of the apparatus and used over again or treated in any desired way. The velocity with which the gas is whirled around in the casing $a$ is very high although of course it varies according to the pressure or partial vacuum maintained inside the casing, and the liquid is not carried out as such into the wind trunk to any appreciable extent. The overhanging ledge $q$ around or near the entrance to the wind trunk is intended to prevent any accidental splashing of the liquid into the wind trunk at this point. The vanes or blades $g$ act as before-mentioned to restrict or prevent the continuance of the whirling motion in the gas in the wind trunk, this being generally desirable.

The liquid distributer $k$ has been described by way of example only. An alternative arrangement or one which may be used in addition to the distributer $k$ is indicated in Figs. 1 and 2, a channel $r$ being provided at the top of the casing, while a number of apertures $s$ are formed at the bottom of the channel to direct liquid from the channel into the casing in the direction wherein the whirling motion of the gas is taking place. Instead of the shaped slots or openings $s$ which are similar to the openings $b$, any other convenient means may be provided for introducing the liquid, such for instance as inwardly directed pipes $t$ of either of the forms shown in Fig. 11, the advantage of such pipes being that the liquid is thrown out clear from the top and side walls of the casing so that the whirling gas currents completely surround the liquid directly that it is discharged.

The invention is not limited to any particular method of introducing the liquid and the methods above referred to are indicated by way of example only. The liquid might even be sprayed into the casing through some or all of the apertures $b$ together with the incoming air or gas. The liquid might also be distributed over the outer wall as well as over the inner wall of the casing if desired. Other ways of distributing the liquid inside the casing might be suggested.

In an apparatus constructed for experimental purposes substantially on the lines indicated in Figs. 1 and 2, the cylinder $a$ being about 2 feet 6 inches in diameter and 2 feet high, an air current of 5000 cubic feet per minute was drawn through the wind trunk $c$ by means of a suitable fan, the air being approximately at 60 degrees Fahrenheit, and about 50 lbs. of water were fed into the apparatus per minute through a channel such as $r$ and slots such as $s$, or pipes such as $t$. The apertures $b$ were in this case about one third of an inch across on the edge $x$, Fig. 7, and the length of each from $x$ to $y$ was about half an inch, while about 4500 apertures $b$ were used. It was found that the desired interactions between the air and the water were obtained in a satisfactory manner under these conditions. It is to be clearly understood however that these proportions of gas and liquid, and the dimensions of the apparatus are mentioned solely by way of example, and of course interactions between a gas and a liquid can be obtained with widely different proportions in apparatus of this type.

Evidently the wind trunk $c$ might pass out at the top of the apparatus instead of the bottom thereof and a perforated or other collecting pipe might be used through which the gas would pass from the interior of the casing into the wind trunk, see Figs. 12 and 13. The apertures by which the gas enters the wind trunk might be in the form of holes or long slots arranged straight or tangentially, and to maintain or to counteract to any required extent the whirling motion of the gas. If the gas is forced into the apparatus by pressure instead of being sucked through the apparatus, the gas may be introduced through a surrounding casing $u$ of volute shape as indicated diagrammatically in Fig. 4. Such a casing into which the gas is forced at $v$ will serve to feed the gas approximately evenly to all parts of the cylindrical surface $a$ and at the same time it will tend to impart a tangential motion to the gas before it passes through the openings in the wall $a$. A liquid or vapor may be introduced into the gas in the volute casing if required in order to effect preliminary treatment at that stage, as for instance the removal of larger particles from the incoming gas by means of a falling stream of water.

The perforated casing $a$ is not necessarily stationary. It may be caused to revolve in either direction of rotation, being driven for this purpose by any suitably arranged pulley and belt or the like. Moreover if the casing $a$ is left free to revolve, it may be turned by the whirling action of the incoming gas. In experiments which have been made with apparatus as in Fig. 3 it has been found that the casing will revolve in the opposite direction to that in which the whirling gas and liquid currents are revolving inside the casing, when air is drawn through the apparatus by a fan. Fig. 3 indicates a possible use of a revolving casing. The liquid is fed to a channel at the top of the casing $a$ and flows into the casing through suitable apertures $s$ around the top. The liquid is discharged through apertures at 21 at the bottom of the casing and is received in a trough or tray 22, 23 being an overflow. It is supposed to be desirable in this case to elevate the liquid and to pass it through the apparatus repeatedly. Curved pipes 24 are employed for this purpose, their inner ends 25 being formed as scoops turned in the right direction to take up the liquid in the trough 22 as the casing $a$ rotates, the liquid being then thrown outward and upward by centrifugal action and discharged at the top 26 into the channel communicating with the casing $a$. Any desired number of pipes 24 might be used for scooping up the liquid, but as a rule two such pipes oppositely arranged on the casing would probably be sufficient. The casing is shown as being supported by a wheel or bracket 27 on a shaft 28 which passes through a similarly formed member 29 acting as a guide and is carried lower down in a similar member 30 formed with a footstep bearing. The rotation of the casing $a$ may increase the interaction between the liquid and gas, and it may be useful for other purposes besides the raising of the liquid this being only mentioned as an example. Where the lifting pipes 24 are not used or do not lift sufficient liquid, a pipe or pipes such as 20 may be employed instead or in addition to supply liquid to the channel at the top of the casing $a$.

Fig. 5 shows an arrangement wherein three circular shells $a$, $a^1$, $a^2$, are arranged one inside another for the purpose of subjecting the gas to successive treatment by a liquid at a number of stages. Evidently the arrangement might be extended to any desired number of concentric casings. The liquid may be fed to the top of each wall $a$, $a^1$, $a^2$, by means of apertures $s$ in the bottoms of the troughs $r$ as shown and may be discharged from the bottom through pipes $o$ or in any other suitable way. The liquid may also be thrown outward from holes in the inner shells onto the outer shells or into the interacting zones of liquid and gas in said outer shells. The gas may be subjected to the successive treatment in many other ways as for instance by being passed successively through any desired number of complete devices as shown in Fig. 1, the gas being drawn through or forced through these in series.

Fig. 6 shows in diagram the use of a hood 31 surrounding part of a shell $a$ of an apparatus of the type referred to for the purpose of introducing the gas to a part of the wall of the apparatus, while atmospheric air or another gas is free to enter the other part thereof. This may be useful in cases where it is desired to mix two or more gases in the apparatus or where for instance foul and hot air is being cleansed and cooled and mixed with a certain amount of comparatively clean air. The foul air in this case is brought up through a pipe $w$ having suitable dampers in it, to the hood 31 of the apparatus, which latter may be on the roof of a building for instance, and the air after treatment in the apparatus passes down again through the wind trunk in the way already described. The hood 31 may have a door in it which can be opened when the pipe $w$ is closed so as to give the outside air or gas access to the whole of the casing $a$.

Instead of being arranged as in Fig. 6 a cylindrical hood of larger diameter than the casing $a$ might fit over the top of the apparatus and extend down to any desired level thereof or one or more hoods of volute form similar to that shown in Fig. 4 might be used as shown at $u'$ in Figs. 15 and 16. The hood may be arranged to be adjusted in order to determine the relative proportions of the two constituent gases.

In order to prolong or diminish the period of interaction of the liquid and gas the circular tangentially ported casing may be tapered instead of cylindrical, the largest diameter being at the upper end when a prolonging effect is desired and at the lower end when it is desired to diminish the period, for instance, where there is a large amount of solid matter suspended in the gas and capable of being quickly taken up by the liquid. This method of combining the influence of gravity and centrifugal force for the purpose of controlling the movements of fluids and of solid particles therein is well known. It is pointed out, however, that a downwardly tapered chamber constructed in accordance with the present invention has special advantages which will now be described with reference to Figs. 12 and 13 of the drawings which show an apparatus of this kind. The tapering casing $a$ is arranged between top and bottom annular plates 33 and 34. The central portion of the upper end of the casing is inclosed, for instance, by means of a sheet of glass as shown at 35. The inlet apertures $b$ for the gas are arranged in the lower part of the casing $a$ and above them is a ring of apertures 36 which are also preferably formed approximately tangential to the casing and are arranged in the direction opposite to that of the gas inlet apertures $b$. This is shown by the two sides of Fig. 13, the left-hand side being a section through the upper ring of apertures 36, and the right-hand side a section through a ring of gas inlet apertures $b$. Liquid is admitted to the casing and delivered to the upper surface of the base-plate 34, for instance, by means of the pipe 37. When the apparatus is working the rotary motion of the gas causes a rotation of the liquid and this is then caused by centrifugal action to move up the inclined wall of the casing. It is thus automatically distributed over the surface through which the gas enters. On passing the upper limit of this surface the liquid comes to the ring of apertures 36 which owing to their direction facilitate the outflow of the liquid through the casing $a$ into the annular chamber 38. From this chamber the liquid passes by way of a pipe 39, which may enter a liquid seal 40 from which the surplus liquid escapes by an overflow 41. It may however be desired to return the liquid from the upper part of the casing to the lower part, so that it may be used over again. The pipe 39 could then be carried, as shown in dotted lines, to an aperture in the base-plate 34. The outlet for the liquid from the casing should be inclosed so as to prevent the entry of air currents which would check or entirely prevent the outflow of the liquid. An overflow pipe 42 may also be arranged in the base-plate 34, this pipe being provided at its upper end with a mouth facing the direction of rotation of the liquid so as to gather in the surplus liquid. As indicated in the drawings, this pipe is preferably arranged so as to form a seal to the outlet. An arrangement may be provided for the purpose of heating or cooling the liquid before it is returned to the casing $a$ after passing through the outlet apertures 36. For instance a heating or cooling pipe 44 may be arranged in the outlet chamber 38. As shown in the drawings a perforated casing 43 is provided to inclose the upper end of the outlet trunk $c$. The apertures in this casing 43 are radially directed and the function of this casing is to stop or reduce the whirling motion of the gas as it passes into the trunk. The apertures might if desired be arranged tangentially or intermediate between radially and tangentially. It will be understood that although only a single ring of outlet apertures 36 for the liquid has been illustrated, two or more rings may be employed, or that other means for the removal of the liquid may be resorted to. In some cases also, no means for the removal of the liquid at the upper part of the casing need be provided.

Figure 8:
Figure 9:
Figure 10:

The forms of apertures shown in Figs. 7 to 10 will need very little description here. In Figs. 7 and 8 the apertures are formed by cutting or shearing and pressing outward the parts $b$ of the wall $a$ of the casing in the manner already referred to, for the purpose of providing admission passages which are approximately tangential to the curvature of the casing. The apertures are at some distance apart in Figs. 7 and 8, and smaller apertures arranged closely together are shown in Fig. 9, this being perhaps preferable in order to submit the liquid to the more frequent action of impinging streams of gas as the circulation takes place in the casing, and to provide less plain surface in the wall of the casing over which the liquid may flow without being broken up, and to provide a larger number of smaller streams of gas. The projections $b$ may be on the outside or on the inside of the casing $a$, as may be preferred. Fig. 10 shows the use of apertures 32 punched out in a comparatively thick plate $a$ at a considerable angle to the plate for the purpose of forming the approximately tangential openings for the passage of the gas through the plate. If the edges of the openings in the plate $a$ are at all thick it may be desirable to thin or pare down these edges in order to prevent the collection on such edges of drops of liquid of any large size. The edges of the apertures may be made to overlap to some extent if desired as in Fig. 10, or by flattening out and so extending the edges of the walls of the apertures of Figs. 7 to 9.

As shown in Fig. 14 the gas inlet apertures *b* may be inclined to the horizontal, this inclination being either upward or downward. A downward inclination would facilitate the falling of the solid particles suspended in the gas and might be employed where it is desired to diminish the period of interaction between the liquid and gas by increasing the rate of downflow of the liquid. With an upward inclination of the apertures *b* a lifting action may be exerted on the liquid having an effect similar to that which is obtained with the arrangement shown in Figs. 12 and 13 without however requiring the use of the tapering casing *a*. The streams of gas would then directly impart rotary and upward movement to the liquid.

Although the provision of upwardly inclined apertures *b* as shown in Fig. 12, may in some cases permit tapering of the casing to be dispensed with, in other cases it may be desirable to use inclined apertures in a tapering casing so as to combine the two means for imparting to the liquid an impulse having a component in a direction at right angles to that of the whirling motion.

As has been already indicated the use of the various features shown in the different figures of the drawings does not exclude the use of the other features in the same apparatus. Figs. 15 and 16 illustrate an arrangement in which various features previously described are combined in a single apparatus. It is unnecessary to give a full description of the details of these figures since they have already been described. It is sufficient to point out that two concentric casings $a^3$ and $a^4$ are employed, the outer casing being cylindrical and the inner casing being conical. The supply of gas to the ports of the casing $a^3$ is divided into two parts by the use of the volute shaped feeding duct $u'$ which surrounds the lower part of the set of ports. On the way to the central outlet wind trunk *c* the gas currents come in contact with both a radially perforated cylindrical member 43, similar to that shown in Figs. 12 and 13, and radial vanes *g* similar to those shown in Figs. 1 and 5. The cylindrical casing $a^3$ has its gas inlet ports inclined upward, as shown in Fig. 14, while the ports in the conical casing $a^4$ are similar to those shown in Fig. 7. The liquid is in each case supplied to the lower edges of the casings and is lifted by the action of the currents of gas. The liquid which rises to the upper edge of the ported portion of the casing $a^3$ is carried off by ports 36, and an arrangement similar to that shown in Figs. 12 and 13.

I declare that what I claim is:—

1. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, and means for causing gas to flow through the casing entering by way of the tangentially directed ports, whereby whirling currents are produced inside the casing.

2. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, and means for causing gas to flow through the casing entering by way of the tangentially directed ports, whereby whirling currents are produced inside the casing.

3. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for supplying liquid to one end of said wall and distributing it therefrom over the curved surface, and means for causing gas to flow through the casing entering by way of the tangentially directed ports, whereby whirling currents are produced inside the casing.

4. Apparatus for producing interaction between liquids and gases or vapors comprising a circular casing, a plurality of comparatively small ports in the curved wall of said casing, said ports being directed approximately tangentially to the concave inner surface of the wall, means for supplying liquid to one end of said wall and distributing it therefrom over the curved surface, and means for causing gas to flow through the casing entering by way of the tangentially directed ports, whereby whirling currents are produced inside the casing.

5. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, and means for withdrawing the gas from the casing at a part remote from the curved wall.

6. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, and means for withdrawing the gas from the casing at a part adjacent the center thereof.

7. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for supplying liquid to one end of said wall and distributing it therefrom over the curved surface, means for causing gas to flow into the casing by way of the tangentially directed ports, whereby whirling currents are produced inside the casing, and means for withdrawing the gas from the casing at a part remote from the curved wall.

8. Apparatus for producing interaction between liquids and gases or vapors comprising a circular casing, a plurality of comparatively small ports in the curved wall of said casing, said ports being directed approximately tangentially to the concave inner surface of the wall, means for supplying liquid to one end of said wall and distributing it therefrom over the curved surface, means for causing gas to flow into the casing by way of the tangentially directed ports, whereby whirling currents are produced inside the casing, and means for leading the gas from the casing at a part adjacent the center thereof.

9. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, means for withdrawing the gas from the casing at a part remote from the curved wall, and means for checking the whirling motion of the gas as it is withdrawn.

10. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, means for withdrawing the gas from the casing at a part adjacent the center thereof, and means for checking the whirling motion of the gas as it is withdrawn.

11. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, means for withdrawing the gas from the casing at a part remote from the curved wall, and vanes located adjacent the outlet from the casing so as to check the whirling motion of the gas as it is withdrawn.

12. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, means for withdrawing the gas from the casing at a part adjacent the center thereof, and vanes located adjacent the outlet from the casing so as to check the whirling motion of the gas as it is withdrawn.

13. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, means for leading gas to the outside ends of the ports, and means for causing gas to flow through the ports into the casing, whereby whirling currents are produced inside the casing.

14. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, means for leading gas to the outside ends of the ports, and means for causing gas to flow through the ports into the casing whereby whirling currents are produced inside the casing.

15. Apparatus for producing interaction between liquids and gases or vapors comprising a circular casing, a plurality of comparatively small ports in the curved wall of said casing, said ports being directed approximately tangentially to the concave inner surface of the wall, means for feeding liquid to the region adjacent to said wall, a volute shaped casing surrounding said circular casing and leading gas to ports therein, means for causing gas to flow through said volute casing and through the tangential ports in the circular casing, whereby whirling currents are produced inside the said circular casing.

16. Apparatus for producing interaction between liquids and gases or vapors, comprising a casing, a wall curved in general contour and forming part of said casing, a plurality of comparatively small ports in said wall, said ports being directed approximately tangentially to the concave inner surface of the wall, means for feeding liquid to the region adjacent to said wall, means for dividing the ports into a plurality of sets adapted to receive gas from different sources, and means for causing gas to flow through the casing entering by way of the tangentially directed ports, whereby whirling currents are produced inside the casing.

17. Apparatus for producing interaction between liquids and gases or vapors comprising a casing, a wall curved in general contour and forming part of said casing, means for introducing into the casing a plurality of streams of gas through said curved wall, means for producing whirling motion of the gas in the casing, means for supplying liquid to the region adjacent said curved wall and for imparting whirling motion to the liquid by the gas in the said region, and means for withdrawing the gas from the said region whereby centrifugal action is caused to separate liquid particles from the gas and retain the said particles in the neighborhood of the curved wall.

18. Apparatus for producing interaction between liquids and gases or vapors comprising a circular casing, means for introducing into the said casing a plurality of streams of gas through the circular wall of said casing, means for producing whirling motion of the gas in the said casing, means for supplying liquid to the region adjacent the said circular wall and for imparting whirling motion to the liquid by the gas in this region, and means for withdrawing the gas from this region whereby centrifugal action is caused to separate liquid particles from the gas and retain the said particles in the neighborhood of the circular wall.

19. Apparatus for producing interaction between liquids and gases or vapors comprising a casing, a wall curved in general contour and forming part of said casing, means for introducing into the casing a plurality of streams of gas through said curved wall and producing whirling motion of the gas in the casing, means for supplying liquid to the region adjacent said curved wall, and means for causing the gas to exert upon the liquid a force acting at right-angles to the direction of whirling.

20. Apparatus for producing interaction between liquids and gases or vapors comprising a circular casing, means for introducing into the said casing a plurality of streams of gas through the circular wall of said casing and producing whirling motion of the gas in the said casing, means for supplying liquid to the region adjacent the said circular wall, means for causing the gas to exert upon the liquid a force acting at right-angles to the direction of whirling.

21. Apparatus for producing interaction between liquids and gases or vapors comprising a casing, a wall curved in general contour and forming part of said casing, means for introducing into the casing a plurality of streams of gas through said curved wall and producing whirling motion of the gas in the casing, means for supplying liquid to the region adjacent said curved wall, means for guiding the liquid so that the centrifugal action due to the whirling motion imparted to it by the gas causes it to move in a direction having a component perpendicular to the plane of whirling of the gas, and means for drawing the gas away from the region adjacent the curved wall.

22. Apparatus for producing interaction between liquids and gases or vapors comprising a circular casing, means for introducing into the said casing a plurality of streams of gas through the circular wall of said casing and producing whirling motion of the gas in the said casing, means for supplying liquid to the region adjacent the said circular wall, means for guiding the liquid so that the centrifugal action due to the whirling motion imparted to it by the gas causes it to move in a direction having a component perpendicular to the plane of whirling of the gas, and means for drawing the gas away from the region adjacent the circular wall.

23. Apparatus for producing interaction between liquids and gases or vapors comprising a casing, a wall curved in general contour and forming part of said casing, said wall being inclined to the axis about which the gases whirl in the said casing, means for introducing into the casing a plurality of streams of gas through said curved wall and producing whirling motion of the gas in the casing, means for supplying liquid to the region adjacent said curved wall so that whirling motion is imparted to the liquid by the gas in the said region, and means for drawing the gas away from the region adjacent the curved wall.

24. Apparatus for producing interaction between liquids and gases or vapors comprising a circular tapering casing, means for introducing into the said casing a plurality of streams of gas through the circular wall of said casing, and producing whirling motion of the gas in the said casing, means for supplying liquid to the region adjacent to said circular wall, so that whirling motion is imparted to the liquid by the gas in this region, and means for drawing the gas away from this region.

25. Apparatus for producing interaction between liquids and gases or vapors comprising a circular tapering casing arranged with its axis approximately vertical, means for introducing into the said casing a plurality of streams of gas through the circular wall of said casing, and producing whirling motion of the gas in the said casing, means for supplying liquid to one end of the circular inclined wall of the casing, and for distributing it over the said wall, so that it has whirling motion imparted to it by the gas in the region adjacent the circular wall, and means for drawing the gas away from the region adjacent the circular wall.

26. Apparatus for producing interaction between liquids and gases or vapors comprising a circular casing arranged with its axis approximately vertical and having the circular wall converging toward the lower end, means for introducing into said casing a plurality of streams of gas through the curved wall of said casing, and producing whirling motion of the gas in said casing, means for supplying liquid to the lower edge of the curved wall, in the presence of the whirling currents of gas which impart whirling motion to the gas in the region adjacent the curved wall, and means for drawing the gas away from said region.

27. Apparatus for producing interaction between liquids and gases or vapors comprising a casing, a wall curved in general contour and forming part of said casing, said wall being inclined to the axis about which the gases whirl in the said casing, a plurality of comparatively small ports in said wall, said ports being directed approximately tangentially to the concave inner surface of the wall, means for feeding liquid to the region adjacent to said wall, and means for causing gas to flow through the casing, entering by way of the tangentially directed ports, whereby whirling currents are produced inside the casing.

28. Apparatus for producing interaction between liquids and gases or vapors comprising a circular tapering casing, a plurality of comparatively small ports in the curved wall of said casing, said ports being directed approximately tangentially to the concave inner surface of the wall, means for feeding liquid to the region adjacent to the said wall, and means for causing gas to flow through the casing entering by way of the tangentially directed ports, whereby whirling currents are produced inside the casing.

29. Apparatus for producing interaction between liquids and gases or vapors comprising a circular casing arranged with its axis approximately vertical and having the curved wall converging toward the lower end, a plurality of comparatively small ports in said curved wall, said ports being directed approximately tangentially to the concave inner surface of the wall, means for supplying liquid to the lower edge of the curved wall, means for imparting whirling motion to the liquid by the gas in the region adjacent the curved wall, and means for withdrawing the gas from the casing at a part adjacent the axis thereof.

30. Apparatus for producing interaction between liquids and gases or vapors comprising a circular casing, a plurality of comparatively small ports in the curved wall of said casing, said ports being directed approximately tangentially to the concave inner surface of the wall, means for supplying liquid to one end of said wall and distributing it therefrom over the curved surface, means for carrying off liquid from the other end of said wall, and means for causing gas to flow through the casing entering by way of the tangentially directed ports, whereby whirling currents are produced inside the casing.

31. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said ports, and means for leading away liquid from the part of the casing above said tangential ports.

32. Apparatus for producing interaction between liquids and gases or vapors comprising a casing, a wall curved in general contour and forming part of said casing, a plurality of comparatively small ports in said wall, said ports being directed approximately tangentially to the concave inner surface of the wall so that streams of gas entering through said ports produce whirling currents inside the casing, said ports also being disposed at an inclination to a plane perpendicular to the axis about which the streams whirl, means for feeding liquid to the region adjacent to said curved wall, and means for causing gas to flow in at the tangential ports and through the casing.

33. Apparatus for producing interaction between liquids and gases or vapors comprising a circular casing, a plurality of comparatively small ports in said wall, said ports being directed approximately tangentially to the concave inner surface of the wall so that streams of gas entering through said ports produce whirling currents inside the casing, said ports also being disposed at an inclination to a plane perpendicular to the axis about which the streams whirl, means for feeding liquid to the region adjacent to said curved wall, and means for causing gas to flow in at the tangential ports and through the casing.

34. Apparatus for producing interaction between liquids and gases or vapors comprising a casing, a wall curved in general contour and forming part of said casing, a plurality of comparatively small ports in said wall, said ports being directed approximately tangentially to the concave inner surface of the wall, so that streams of gas entering through said ports produce whirling currents inside the casing, said ports also being disposed at an inclination to a plane perpendicular to the axis about which the streams whirl, means for feeding liquid to one end of said wall adjacent the tangential ports therein, and means for causing gas to flow into the tangential ports and through the casing.

35. Apparatus for producing interaction between liquids and gases or vapors comprising a casing, a wall curved in general contour and forming part of said casing, a plurality of comparatively small ports in said wall, said ports being directed approximately tangentially to the concave inner surface of the wall so that streams of gas entering through said ports produce whirling currents inside the casing, said ports also being disposed at an inclination to a plane perpendicular to the axis about which the streams whirl, means for feeding liquid to one end of said wall adjacent the tangential ports therein, means for collecting and leading off liquid from the other end of said wall, and means for causing the gas to flow into the tangential ports and through the casing.

36. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave inner surface of the wall, so that streams of gas entering through said ports produce whirling currents inside the casing, said ports also being disposed at an inclination to a plane perpendicular to the axis about which the streams whirl, means for feeding liquid to one end of said wall adjacent the tangential ports therein, and means for causing gas to flow into the tangential ports and through the casing.

37. Apparatus for producing interaction between liquids and gases or vapors comprising a circular casing, means for supporting said casing so as to be rotatable about its axis, a plurality of comparatively small ports in the curved wall of said casing, said ports being directed approximately tangentially to the concave inner surface of the wall, means for feeding liquid to the region adjacent to said wall, and means for causing gas to flow through the casing entering by way of the tangentially directed ports, whereby whirling currents are produced inside the casing.

38. Apparatus for producing interaction between liquids and gases or vapors comprising a circular casing, means for supporting said casing so as to be rotatable about its axis, a plurality of comparatively small ports in the curved wall of said casing, said ports being directed approximately tangentially to the concave inner surface of the wall, means for feeding liquid to the region adjacent to said wall, means for causing gas to flow into the casing by way of the tangentially directed ports, whereby whirling currents are produced inside the casing, and means for withdrawing the gas from the casing at a part adjacent the center thereof.

39. Apparatus for producing interaction between liquids and gases or vapors comprising a plurality of circular casings arranged concentrically one within the other, a plurality of comparatively small ports in the curved wall of each of said casings, said ports being directed approximately tangentially to the concave inner surface of the said walls, means for feeding liquid to the regions adjacent said walls, and means for causing gas to flow through the casings entering by way of the tangentially directed ports, whereby whirling currents are produced inside the casings.

40. Apparatus for producing interaction between liquids and gases or vapors comprising a plurality of circular casings arranged concentrically one within the other, a plurality of comparatively small ports in the curved walls of said casings, said ports being directed approximately tangentially to the concave inner surface of the walls, means for feeding liquid to the region adjacent said walls, an outlet duct located in the center of the innermost casing, and means for causing gas to flow by way of the tangentially directed ports through the casings in series and out through the central duct.

41. Apparatus for producing interaction between liquids and gases or vapors comprising a circular casing formed of two end plates and a curved wall located between said end plates, a plurality of comparatively small ports in said curved wall, said ports being directed approximately tangentially to the concave inner surface of the wall, ducts for liquid adjacent the end plates, an outlet duct for gas in one end plate, and a gas propelling device connected to said casing and causing the gas to flow through said tangentially directed ports into the casing and out from the casing by way of the duct in the end plate.

42. Apparatus for producing interaction between liquids and gases or vapors comprising a circular casing formed of two end plates, and a curved wall located between said end plates, a plurality of comparatively small ports in said curved wall, said ports being directed approximately tangentially to the concave inner surface of the wall, ducts for liquid adjacent the end plates, a wind trunk connected to the center of one end plate, a guiding device located in the casing adjacent the end of said wind trunk, a gas propelling device connected to the casing, and causing gas to flow through said tangential ports into the casing whirling around therein and passing out through the wind trunk, the whirling motion being checked by the guiding device.

43. Apparatus for producing interaction between liquids and gases or vapors comprising a circular casing, a plurality of comparatively small ports in the curved wall of said casing, said ports being directed approximately tangentially to the concave inner surface of the wall, means for supplying liquid to one end of said wall and distributing it therefrom over the curved surface, means for carrying off liquid from the other end of said wall, means for conducting liquid from the carrying off means to the supplying means so as to provide for its re-use in the casing, and means for causing gas to flow through the casing entering by way of the tangentially directed ports, whereby whirling currents are produced inside the casing.

44. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said ports, means for leading away liquid from the part of the casing above said tangential ports, and means for conducting liquid from the last mentioned means to the supplying means so as to provide for its reuse.

45. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said gas inlets, a plurality of liquid outlet ports in the part of the casing above the gas inlet ports, an annular collecting chamber communicating with said outlet ports, and means for carrying off liquid from the said chamber.

46. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said gas inlet ports, a plurality of liquid outlet ports in the part of the casing above the gas inlet ports, an annular collecting chamber communicating with said outlet ports, and means for conducting the liquid from said chamber to said supplying means so as to provide for its re-use.

47. Apparatus for producing interaction between liquids and gases or vapors comprising a circular casing, a plurality of comparatively small ports in the curved wall of said casing, said ports being directed approximately tangentially to the concave inner surface of the wall, means for supplying liquid to one end of said wall and distributing it therefrom over the curved surface, means for carrying off liquid from the other end of said wall, means for conducting liquid from the carrying off means to the supplying means so as to provide for its re-use in the casing, means for subjecting the liquid to the action of a heat interchanging device while passing through said conducting means, and means for causing gas to flow through the casing entering by way of the tangentially directed ports, whereby whirling currents are produced inside the casing.

48. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said ports, means for leading away liquid from the part of the casing above said tangential ports, means for conducting liquid from the last mentioned means to the supplying means so as to provide for its re-use, and means for subjecting the liquid to the action of a heat interchanging device while passing through said conducting means.

49. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said gas inlets, a plurality of liquid outlet ports in the part of the casing above the gas inlet ports, an annular collecting chamber communicating with said outlet ports, heat interchanging means located in said chamber, and means for carrying off liquid from the said chamber.

50. Apparatus for producing interaction between liquids and gases or vapors comprising a circular casing arranged with its axis approximately vertical and having the circular wall converging toward the lower end, a plurality of comparatively small ports in said wall, said ports being directed approximately tangentially to the concave surface of said wall, means for producing a flow of gas into the casing through said ports whereby whirling currents are produced inside the casing, means for supplying liquid to the neighborhood of the lowest of said gas inlet ports, a plurality of liquid outlet ports in the part of the casing above the gas inlet ports, an annular collecting chamber communicating with said outlet ports, heat interchanging means located in said chamber, and means for conducting the liquid from said chamber to said supplying means so as to provide for its re-use.

In witness whereof, I have hereunto signed my name this 22nd day of November 1911, in the presence of two subscribing witnesses.

JOHN ALSTON HART.

Witnesses:
GEORGE HERBERT LEWIS,
HERBERT WALMSLEY.